(12) United States Patent
Lagger et al.

(10) Patent No.: US 10,099,335 B2
(45) Date of Patent: Oct. 16, 2018

(54) HOLDER FOR MACHINING UNITS

(71) Applicant: MIKRON SA AGNO, Agno (CH)

(72) Inventors: Luciano Lagger, Montagnola (CH);
Walter Sayer, Aranno (CH)

(73) Assignee: MIKRON SA AGNO, Agno (CH)

( * ) Notice: Subject to any disclaimer, the term of this patent is extended or adjusted under 35 U.S.C. 154(b) by 176 days.

(21) Appl. No.: 15/197,901

(22) Filed: Jun. 30, 2016

(65) Prior Publication Data

US 2017/0050284 A1    Feb. 23, 2017

(30) Foreign Application Priority Data

Aug. 21, 2015 (EP) ..................................... 15182002

(51) Int. Cl.
| | |
|---|---|
| *B23Q 39/04* | (2006.01) |
| *B23Q 3/18* | (2006.01) |
| *B23Q 1/01* | (2006.01) |
| *B23Q 17/22* | (2006.01) |
| *B23Q 37/00* | (2006.01) |

(52) U.S. Cl.
CPC ........... *B23Q 39/042* (2013.01); *B23Q 1/015* (2013.01); *B23Q 3/186* (2013.01); *B23Q 17/22* (2013.01); *B23Q 37/005* (2013.01)

(58) Field of Classification Search
CPC .... B23Q 39/042; B23Q 37/005; B23Q 17/22; B23Q 3/186; B23Q 1/015
See application file for complete search history.

(56) References Cited

U.S. PATENT DOCUMENTS

| | | | |
|---|---|---|---|
| 2,358,389 A | 9/1944 | Ewart et al. | |
| 2,381,039 A | 8/1945 | Churchhill | |
| 3,643,307 A | 2/1972 | Ledergerber et al. | |
| 3,797,081 A | 3/1974 | Buzzi | |
| 3,817,650 A | 6/1974 | Reich et al. | |
| 6,178,608 B1 * | 1/2001 | Koch ....................... | B23Q 1/52 29/33 P |
| 2004/0107805 A1 | 6/2004 | Baldini et al. | |

FOREIGN PATENT DOCUMENTS

| | | |
|---|---|---|
| CH | 528949 A | 10/1972 |
| DE | 19958461 C1 | 3/2001 |
| EP | 1064119 B1 | 8/2005 |
| EP | 2052811 A1 | 4/2009 |
| FR | 2495978 A1 | 6/1982 |
| JP | 4192251 B2 | 12/2008 |

* cited by examiner

*Primary Examiner* — John C Hong
(74) *Attorney, Agent, or Firm* — Birch, Stewart, Kolasch & Birch, LLP

(57) ABSTRACT

A holder system for mounting and aligning a machining device to a rotary transfer machine. The holder system includes a holder with a first part being mountable on a machine or being part of a machine as well as a second part which is releasably coupled to the first part in a defined first position. The second part is coupled to a third part, the third part coupled with the machining device. Positioning features are located between the second part and the third part to allow moving the third part relative to the second part in at least one spatial direction. Further, the holder system includes at least one alignment station that can releasably couple the second part of the holder to the alignment station in the first defined position and a measuring device configured to measure the position of the third part or of the machining device.

9 Claims, 3 Drawing Sheets

HOLDER FOR MACHINING UNITS

TECHNICAL FIELD

The invention relates to a holder for mounting and aligning machining units to a machine, preferably to a rotary transfer machine.

BACKGROUND ART

Rotary transfer machines are generally controlled with cam mechanisms and were usually constructed for the manufacturing of large batches of the same work piece or family of work pieces which do not differ much from each other. The manual positioning and manual correction of the positioning of machining units mounted on rotary transfer machines is hugely time consuming and very expensive, in particular in cases where a high level of precision is required. The flexibility and the reconfigurability of these machines are therefore limited. However, the simplicity of these machines and their reliability does allow low manufacturing costs and a high inherent availability. Their use requires highly qualified staff with experience and dexterity.

Rotary transfer machines are still manufactured for the machining of work pieces in big batches. In the past few years new rotary transfer machines were developed and produced with machining units equipped with numerical control (CNC). This evolution allows a fast and efficient positioning and correction of the positioning of the machining units regardless of the operator's skills and experience.

However the large number of CNC controlled units causes a significant increase of the construction costs and service costs. The high quantity of electrical devices may increase the probability of default of one of said electrical devices which consequently leads to a decrease of the inherent availability of the machine. Because of the concept of this kind of machines, the downtime of a single station implies the downtime of the entire machine.

For example, EP 1 064 119 (Mikron S. A.) discloses a rotary transfer machine with a stiff base structure and an indexing table comprising a plurality of machining positions. Machining units are coupled to two sides of struts surrounding the indexing table. Each machining unit may be linearly translated about three axes.

JP 4192251 B2 (Seiki Techno Design Co. Ltd.) describes a rotary transfer machine. The body of the machine comprises holes in its sides into which saddles each machining units may be inserted. Each saddle may be moved in the vertical direction by a first servo motor. With a second servo motor each saddle may be moved in a radial direction.

DE 199 58 461 C1 (ESA Eppinger GmbH) discloses a clamping device for machining units, consisting of a platen and a holder. The platen is a regular platen, e.g. a turret. The holder allows to align a machining unit in an external setting system and to keep these alignment settings during storage and transport to a machine. The holder comprises, in addition to a DIN 69880 holder, an adjustment device. The adjustment device comprises two set screws having axes which are parallel to the platen area and which act on a setting bar which abuts onto the platen. With this adjustment device, it is possible to adjust the working axis of the machining unit to be parallel to the working axis of the machine. However, as the alignment relies on the interaction of set screws with a setting bar, the alignment is affected by micro movements.

FR 2 495 978 A (Renault) describes a mounting system for tools. The mounting system comprises an adapter which may be fixed to a shaft of the machine. This mounting system allows a fast change of the tools, as only the adapter has to be initially aligned on an external setting system. A tool holder comprises a special structure with flat nose sections and a channel with which it can be aligned precisely with respect to the adapter.

SUMMARY OF THE INVENTION

It is the object of the invention to create a holder for mounting and aligning a machining unit to a machine, especially of a rotary transfer machine which allows an increased flexibility and re-configurability of the machines such as to reduce the time and cost to set up a machine for a new machining operation.

The solution of the invention is specified by the features of claim 1. According to the invention a system for mounting and aligning a machining unit to a machine, preferably to a rotary transfer machine, comprises a holder including a first part which is mountable on a machine or is part of a machine. The holder further includes a second part which may be releasably coupled to said first part in a first defined position. Said second part is coupled to a third part. Said third part comprises third coupling means to couple said third part with a machining unit. Positioning means are located between said second part and said third part to allow moving said third part relative to said second part in at least one spatial direction. Further, said system comprises at least one alignment station. Said alignment station comprises first coupling means for releasably coupling the second part of the holder to said alignment station in said first defined position. The alignment station includes at least one measuring device arranged on said alignment station, said measuring device configured to measure the position of said third part or of a machining unit coupled to said third part relative to the second part.

A second part of a holder may be connected with said alignment station in the same first defined position as with a first part of the holder. As such, it is possible to position the positioning means of said second part of the holder while said second part is connected with the alignment station. Therefore, if for a given machining operation the position of a machining unit relative to the machine is known, the positioning may be performed on the alignment station, as the position of the first part relative to the machine and of the second part relative to the first part are known.

This greatly increases the flexibility for mounting machining units to a machine and reduces the time used to re-configure a machine, as machining units may be correctly positioned without the need to be already mounted onto the machine. Instead, it is possible to correctly position the machining units independent of the machine by using the alignment station. Then, the second parts may be connected to first parts already mounted on the machine or being part of the machine. Hence, a down-time of the machine due to the exchange or replacement of any machining unit may be greatly reduced.

As understood herein, a "machining unit" is an element which is used to carry out a specific machining operation on a workpiece, such as milling, drilling or any other machining operation. Therefore, preferably, the machining unit comprises one of a mill, drill or any other tool suitable for the intended machining operation.

Preferably, the system according to the present invention is used in connection with a rotary transfer machine. A rotary transfer machine comprises a base structure with a rotatable indexing table. The indexing table comprises a multitude of positions with work piece holders, which may be rotated one or several position(s) at a time. At every position of the indexing table, a machining unit is mounted on the base structure of the rotary transfer machine. Hence, by turning the indexing table one or several position(s) at a time, it is possible to carry out a series of machining operations on a workpiece. However, such that the machining operations are successful, each of the machining units has to be correctly positioned relative to the base structure of the machine.

The positioning means preferably comprise locking means such as to lock the positioning means in a determined position. Hence, after a machining unit coupled to said third part has been positioned relative to said second part by means of the alignment station, said determined position may then be locked with said locking means. Said locking means may e.g. be in the form of a set screw or the like. Further, the locking means may also be in the form of a form fit element which prevents any unwanted movement of the positioning means. Said form fit element may be moved into an disengaged position by actuation means such as e.g. a button or lever to allow a movement of the positioning means.

Alternatively, said positioning means are configured such that they are self-locking, i.e. such that any unwanted movement is prevented. For example, the positioning means may be configured to be movable only by means of a tool.

The at least one plane is preferably arranged such that it is horizontal when said holder is mounted on a machine and said first part and said second part are coupled together. In the present application, a "horizontal plane" is perpendicular to the gradient of the gravity field. Depending on the machining unit and the machining operation to be carried out, the at least one plane may of course also be oriented differently.

Further preferably, the positioning means may allow the movement of said third part—and of any machining unit coupled therewith—about two planes. For example, the third part may be moved about a radial and a tangential plane relative to a rotary transfer machine the holder may be affixed to.

Another aspect of the present application is drawn to a holder, especially suited to work with an inventive system as disclosed herewith. The holder comprises a first part with first coupling means, said first part being mountable on a machine or being part of a machine. The holder further comprises a second part with second coupling means, said second coupling means being configured to interact with said first coupling means such as to releasably couple said second part to said first part in a first defined position. The holder includes a third part coupled to said second part by means of positioning means located between said second part and said third part, said positioning means being configured such as to move said third part relative to said second part in at least one spatial direction. Third coupling means are arranged on said third part to allow coupling said third part to a machining unit.

As the first coupling means and the second coupling means allow to releasably couple the first part and the second part in a first defined position relative to each other, the position of a machining unit coupled to the third part remains unchanged relative to the first part upon disassembly and reassembly of said second part from said first part. Hence, it is possible to carry out a positioning operation with the positioning means once, whereupon the relative position of a machining unit coupled to said third part relative to the first part remains constant independent of the number of times the first part and the second part are disassembled and re-assembled. Hence, with the inventive holder, it is e.g. possible to very quickly convert a machine equipped with a multitude of holders from a first machining operation to a second machining operation, as the third parts coupled to the machining units suitable for the first machining operation may simply be swapped for third parts suitable for the second machining operation. As the position of the machining units coupled to the third parts relative to the first parts remains unchanged, no time consuming and costly alignment operation is necessary.

Further, if a machining unit has to be removed for repair or maintenance, the holder according to the present invention allows a quick re-mounting to the machine, as the time consuming re-alignment of the machining unit may be omitted.

Preferably, the first part includes mounting means which allow mounting said first part to a machine in a second defined position. Said mounting means may for example comprise bolts or screws which are arranged in corresponding openings provided on said first part. Alternatively, the first part may be integral with a machine, i.e. the machine comprises at least one element which includes first coupling means.

The first and the second coupling means are preferably configured such that a temporary fixation of both parts together is achieved. This prevents any unwanted detachment of the first part and of the second part from each other. For example, said first and second coupling means may comprise a set screw or the like to temporary fix said second part to said first part. Alternatively, said first and said second coupling means may comprise form fit elements which allow such a temporary fixation.

The third coupling means preferably comprise an interface compatible with machining units intended for use with a specific machine, such as a rotary transfer machine. Further preferably, said third coupling means may comprise screws or bolts as well as associated apertures such as to couple a machining unit to said second part.

Preferably, said positioning means are configured to move said third coupling means relative to said second coupling means at least along a linear axis and/or at least around one rotational axis.

The positioning means preferably comprise at least two positioning elements, said positioning elements being selected from one of an eccentric bushing and/or a linear guide member.

With the eccentric bushing it is possible to move a machining unit coupled to said third coupling means about two directions in a plane along a circular path. Further, the machining unit may be turned along said circular path relative to said second coupling means, such as to alter the angular position of said machining unit relative to said second coupling means.

Preferably, said positioning means comprises at least one linear guide member which allows a linear translation of said third coupling means relative to said second coupling means in at least one direction.

In a preferred embodiment, the positioning means comprise both an eccentric bushing and a linear guide member or any other combination of two axial positioning systems. Such a configuration allows a simple realization of a positioning means which makes it possible to move a machining unit coupled to said third coupling means in a tangential and radial direction when said holder is coupled to a rotary transfer machine.

Preferably, said first coupling means and said second coupling means comprise a plurality of screws and complementary screw holes.

This allows a very simple realization of a coupling between the first and the second part in the first defined position, as the screws and the screw holes may be arranged to allow only a single alignment of said second part on said first part.

A further aspect of the present application is drawn to a method for mounting and aligning a machining unit to a machine, preferably to a rotary transfer machine, by means of an inventive system for coupling a machining unit to a machine.

In a first step, the first part of the holder is mounted onto the machine. Then, the machining unit is coupled to the second part by means of the third coupling means. In a next step, the second part is coupled to the alignment station and said third connection means or the machining unit is positioned relative to said second connection means by means of the positioning means and of the measuring device. The second part is then removed from the alignment station and finally coupled to said first part by engaging said second coupling means with said first coupling means.

The present application is further directed to a machine, preferably a rotary transfer machine comprising at least one holder according to the present invention.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
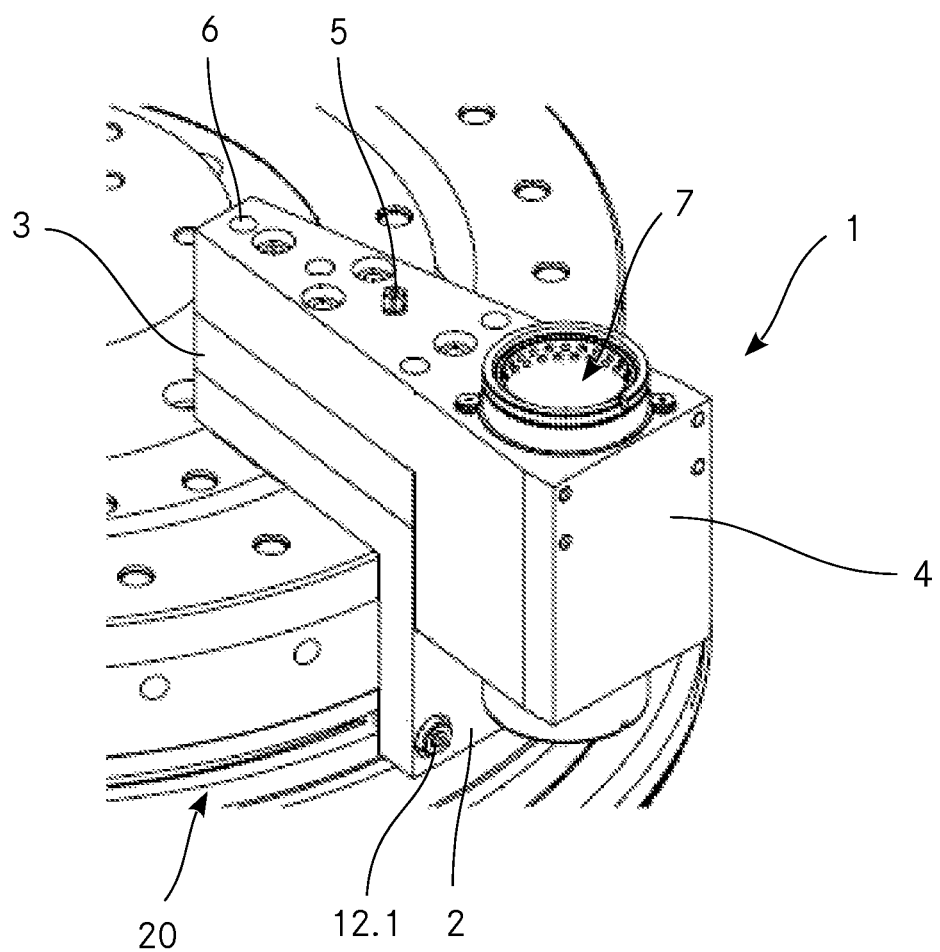
FIG. 1 A perspective view of an inventive holder.

FIG. 1 shows a perspective view of an inventive holder 1 according to the present invention mounted on a rotary transfer machine 20. The holder 1 comprises a first part 2 and a second part 3. The first part 2 and the second part 3 are releasably coupled together with first coupling means and second coupling means engaged one into the other. The second part 3 is coupled to a third part 4 which includes third coupling means 7 to releasably couple said third part 4 to a machining unit. Positioning means 5, 6 are located between said second part 3 and said third part 4. Said positioning means 5, 6 allow moving said third part 4 relative to said second part 3. The first part 2 is attached to the rotary transfer machine by means of screws, of which only one screw 12.1 is visible in the figure.

Figure 2:
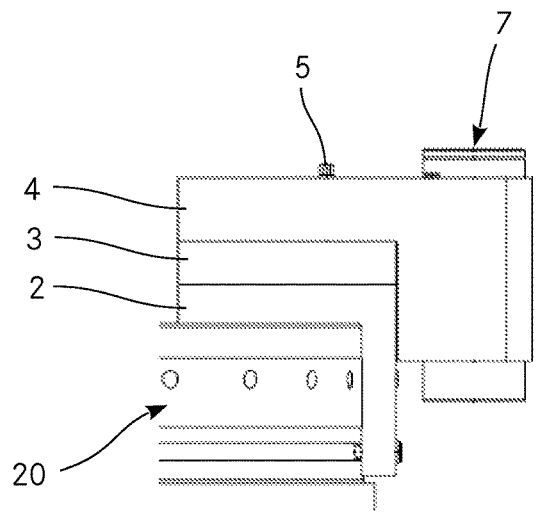
FIG. 2 a profile view of the holder coupled to a machine.

In FIG. 2, the holder 1 according to FIG. 1 is shown in a profile view. While the first part 2 and the second part 3 are releasable from each other, the second part 3 and the third part 4 are coupled together in an essentially non-releasable way by means of the positioning means 5, 6. The first part 2 is releasably coupled to the rotary transfer machine 20 in the embodiment shown. Alternatively, the first part 2 may be part of the rotary transfer machine 20.

Figure 3:
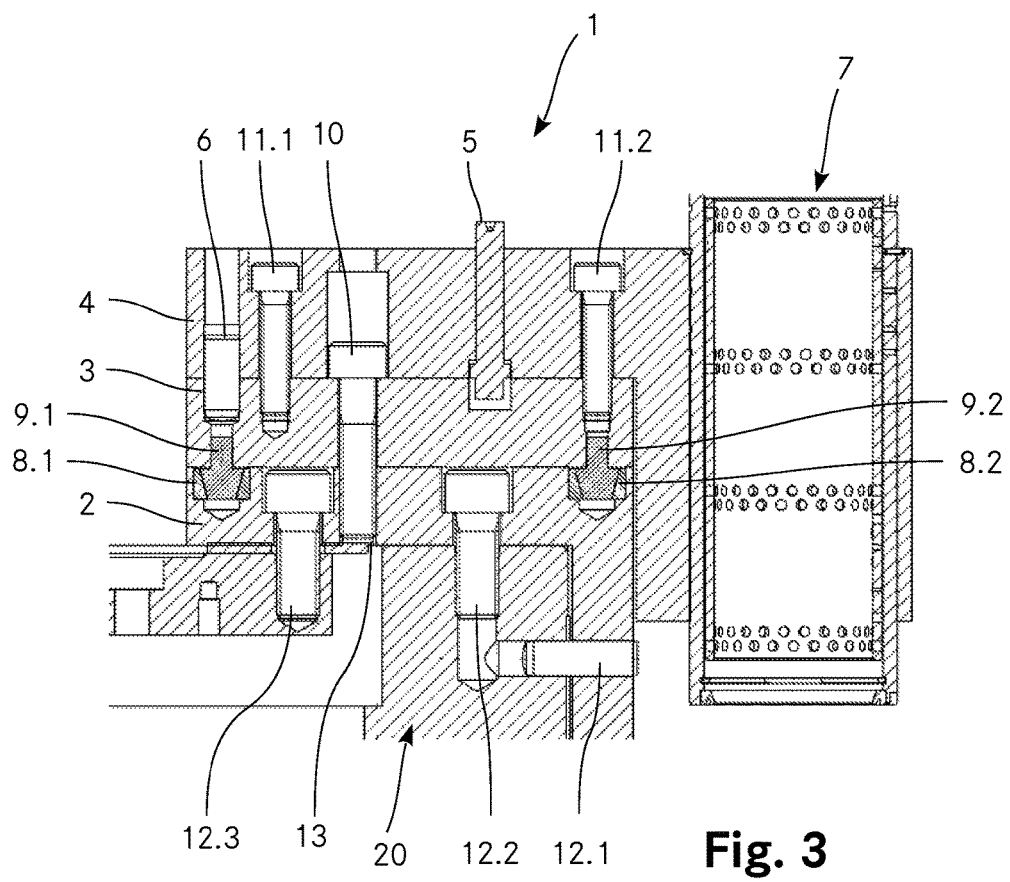
FIG. 3 a cross-sectional representation of the holder according to FIG. 2.

FIG. 3 shows the holder 1 according to FIGS. 1 and 2 in a cross-sectional representation. The first part 2 is connected with the rotary transfer machine 20 by means of several screws 12.1, 12.2, 12.3. First coupling means 8.1, 8.2, 13 are arranged on said first part 2 such as to allow a connection with the second part 3. Two first coupling means are configured as conical holes 8.1, 8.2, while two further first coupling means (arranged one after another in the direction of view) are configured as normal cylindrical screw holes 13, wherein said cylindrical screw holes comprise a thread in said first part.

The second part 3 comprises second connection means 9.1, 9.2, 10 which are insertable into said first connection means 8.1, 8.2, 13 of said first part 2. A first set of said second connection means are configured as conical pin 9.1, 9.2 which fit into said conical holes 8.1, 8.2, while a second set of second connection means (arranged one after another in the direction of view) are configured as screws 10 which are insertable into the cylindrical screw holes 13. The use of conical holes 8.1, 8.2 and conical pin 9.1, 9.2 allows an exact positioning of the second part 3 relative to said first part 2 in a defined first position.

The positioning means located between said second part 3 and said third part 4 are in the form of a rotational axis 6 and an eccentric coupling 5 which allows a limited movement of the third part 4 relative to the second part 3 around the rotational axis 6. Additionally, the position of the third part 4 relative to the second part 3 may be temporary fixed by means of fixation screws 11.1, 11.2. The third connection means are realized as an eccentric bushing 7 into which a machining unit may be inserted.

Figure 4:
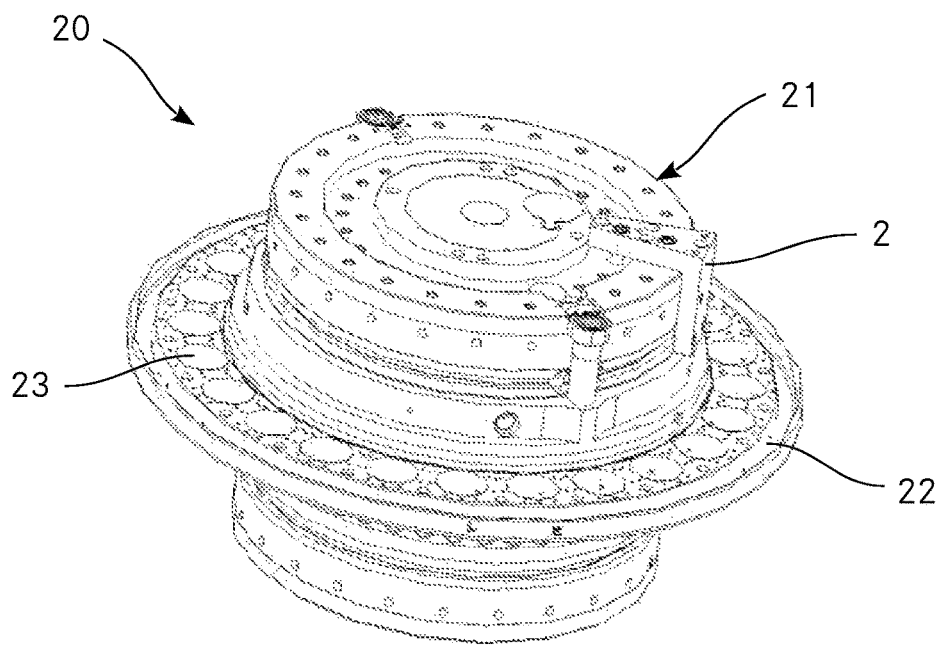
FIG. 4 a simplified perspective view of a first part of an inventive holder mounted on a rotary transfer machine.

FIG. 4 shows a simplified perspective view of a first part 2 of an inventive holder 1 mounted on a rotary transfer machine 20. For reasons of simplicity, only the main parts of the rotary transfer machine 20 are shown. These are notably a base structure 21 onto which an indexing table 22 is rotatably supported. The indexing table 22 comprises a multitude of positions 23 for work piece holders. Such as to carry out subsequent machining operations, a machining unit is assigned to each working position into which the positions 23 may be rotated. In the example shown, a first part 2 of a holder 1 is mounted on the base structure 21 of the rotary transfer machine 20 at one position. However, as a person having skill in the art will recognize, a first part 2 of a holder 1 may be associated with every working position. The second part 2 is mounted to the base structure 21 by means of screws as shown in FIG. 1.

Figure 5:
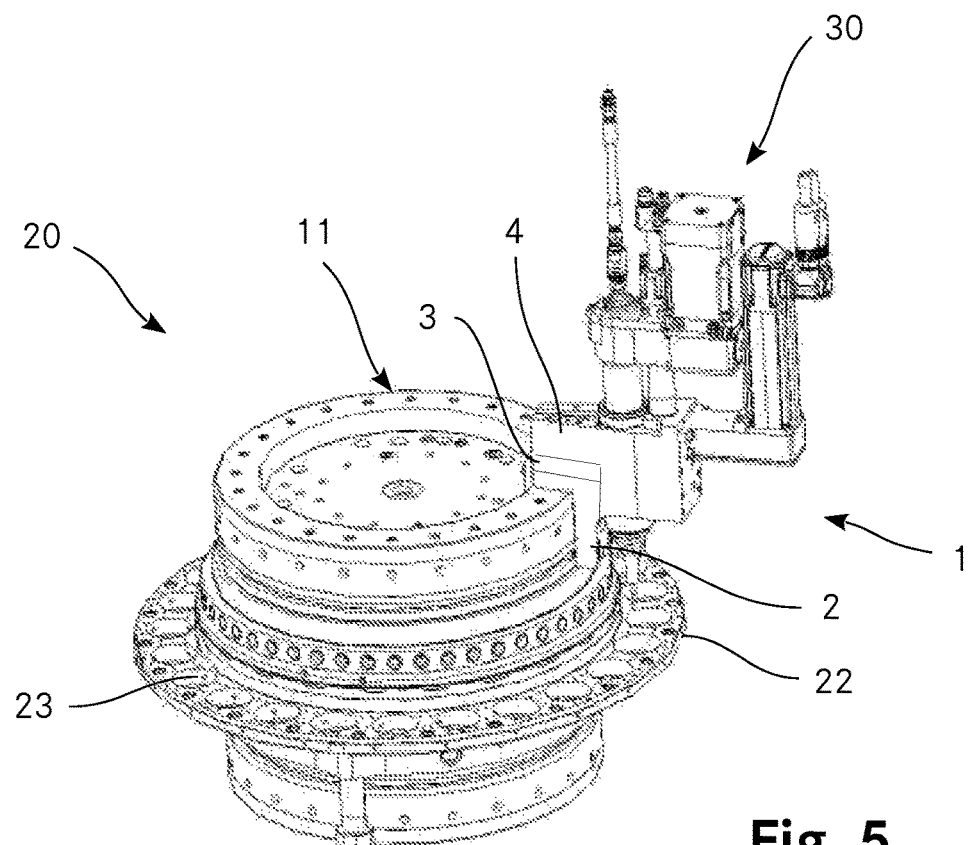
FIG. 5 a simplified perspective view of a machining unit coupled to a rotary transfer machine according to FIG. 1.

FIG. 5 shows a simplified perspective view of a machining unit 30 coupled to a rotary transfer machine 20 by means of an inventive holder 1. The machining unit 30 is coupled to the second part 3 by means of the eccentric bushing 7 acting as third coupling means. The machining unit 30 may be correctly positioned relative to the second part 3 and the rotary transfer machine 20, respectively, by means of the positioning means 5, 6.

The invention claimed is:
1. A system for mounting and aligning a machining unit to a machine, said system comprising:
 a) a holder including a first part, said first part being mountable on a machine or being part of a machine, a second part which is releasably coupled to said first part in a defined first position, said second part being coupled to a third part with third coupling means for coupling said third part with a machining unit, wherein positioning means are located between said second part and said third part to allow moving said third part relative to said second part in at least one spatial direction; and b) at least one alignment station, said alignment station comprising first coupling means for releasably coupling the second part of the holder to said alignment station in said first defined position and at least one measuring device arranged on said alignment station, said measuring device configured to measure the position of said third part or of a machining unit coupled to said third part relative to the second part.

2. A method for mounting and aligning a machining unit to a machine using a system according to claim 1, comprising the steps of:

a) mounting the first part onto the machine;

b) coupling the machining unit to the third part by means of said third coupling means;

c) coupling said second part to the alignment station;

d) aligning of said third part or of the machining unit relative to said second part by means of the positioning means and of the measuring device;

e) removal of the second part from said alignment station;

f) coupling of said second part to said first part in said first defined position relative to each other.

3. A system according to claim 1, wherein said machine is a rotary transfer machine.

4. A holder for mounting and aligning a machining unit to a machine, said holder comprising:

a) a first part with first coupling means, said first part being mountable on a machine or being part of a machine;

b) a second part with second coupling means, said second coupling means being configured to interact with said first coupling means such as to releasably couple said second part to said first part in a first defined position;

c) a third part coupled to said second part by means of positioning means located between said second part and said third part, said positioning means being configured such as to move said third part relative to said second part in at least one spatial direction;

d) third coupling means arranged on said third part allowing to couple said third part to a machining unit.

5. The holder according to claim 4, wherein said positioning means are configured to move said third part relative to said second part at least along a linear axis and/or at least around one rotational axis.

6. The holder according to claim 4, wherein the positioning means comprise at least two translational elements, said translational elements being preferably selected from one of an eccentric bushing and/or a linear guide member.

7. The holder according to claim 4, wherein said first coupling means and said second coupling means comprise a plurality of screws and complementary screw holes.

8. Machine comprising at least one holder according to claim 4.

9. A holder according to claim 4, wherein said machine is a rotary transfer machine.

* * * * *